United States Patent
Mochizuki et al.

(10) Patent No.: US 10,528,779 B2
(45) Date of Patent: Jan. 7, 2020

(54) PORTABLE TERMINAL

(71) Applicant: PANASONIC INTELLECTUAL PROPERTY MANAGEMENT CO., LTD., Osaka (JP)

(72) Inventors: Kenichi Mochizuki, Kanagawa (JP); Yasuyuki Tanaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/234,024

(22) Filed: Dec. 27, 2018

(65) Prior Publication Data
US 2019/0332836 A1    Oct. 31, 2019

(30) Foreign Application Priority Data
Apr. 26, 2018   (JP) ................................. 2018-085073

(51) Int. Cl.
| | |
|---|---|
| G06K 7/10 | (2006.01) |
| H04N 5/225 | (2006.01) |
| G06K 7/14 | (2006.01) |
| H01M 2/10 | (2006.01) |

(52) U.S. Cl.
CPC ....... *G06K 7/10722* (2013.01); *G06K 7/1413* (2013.01); *H04N 5/2253* (2013.01); *H01M 2/1066* (2013.01); *H01M 2220/30* (2013.01)

(58) Field of Classification Search
CPC ............. G06K 7/10722; G06K 7/1478; G06K 7/10881; G06K 7/10524
USPC ............................. 235/462.41, 462.45, 471
See application file for complete search history.

(56) References Cited

U.S. PATENT DOCUMENTS

| | | | |
|---|---|---|---|
| 5,579,487 A | 11/1996 | Meyerson et al. | |
| 5,903,706 A | 6/1999 | Wakabayashi et al. | |
| 2002/0040934 A1 | 4/2002 | Itou et al. | |
| 2012/0113572 A1* | 5/2012 | Gaddis, II ............. | G06F 1/1628 |
| | | | 361/679.01 |
| 2014/0162598 A1* | 6/2014 | Villa-Real ............... | H04M 1/66 |
| | | | 455/411 |
| 2014/0191033 A1 | 7/2014 | Wojcik et al. | |
| 2015/0277503 A1 | 10/2015 | Eremenko et al. | |

(Continued)

FOREIGN PATENT DOCUMENTS

| | | |
|---|---|---|
| CN | 106559524 | 4/2017 |
| EP | 3104250 | 12/2016 |

(Continued)

OTHER PUBLICATIONS

Partial Search Report issued in European Patent Office (EPO) Patent Application No. 18215093.8, dated Jul. 23, 2019.

*Primary Examiner* — Daniel St. Cyr
(74) *Attorney, Agent, or Firm* — Greenblum & Bernstein, P.L.C.

(57) ABSTRACT

A portable terminal includes a main body having a first surface and a second surface, and a first camera. The main body is divided into nine divisional matrix regions. The second surface is attachable to a barcode reader module. The barcode reader module has a second camera for reading a barcode. When the barcode reader module is attached to the second surface, the second camera is readable the barcode in a state that the second surface is directed to the barcode and the second camera is located in the second region of the second surface.

12 Claims, 9 Drawing Sheets

(56) References Cited

U.S. PATENT DOCUMENTS

2016/0012445 A1\* 1/2016 Villa-Real .............. G06Q 20/32
                                                                             705/44
2017/0155746 A1\* 6/2017 Yang ..................... H04M 1/026

FOREIGN PATENT DOCUMENTS

| JP | 03-100960 | 10/1991 |
| --- | --- | --- |
| JP | H10-155165 | 6/1998 |
| JP | 2002-109464 | 4/2002 |

\* cited by examiner

PORTABLE TERMINAL

CROSS REFERENCE TO RELATED APPLICATIONS

This application is based on Japanese Patent Application (No. 2018-085073) filed on Apr. 26, 2018, the contents of which are incorporated herein by reference.

BACKGROUND OF THE INVENTION

1. Field of the Invention

The present disclosure relates to a portable terminal such as a tablet terminal.

2. Description of the Related Art

Electronic devices are known that are equipped with a barcode reader and can accommodate different directions (refer to JP-UM-A-3-100960 and JP-A-2002-109464).

JP-UM-A-3-100960 discloses a hand-held data collection device equipped with a barcode reading means in which the barcode reading means provided in a first body can be connected to a second body rotatably, whereby a user can manipulate it with either of his or her left and right hands.

JP-A-2002-109464 discloses a code reading device in which an optical mechanism for guiding reflection light coming from a reading target and input through a reading opening to a linear sensor is formed by plural optical-path-bending reflection mirrors. A traveling direction of the reflection light is changed by 180° by the plural reflection mirrors. This code reading device can be used as both of a straight-type device in which of the entire body of a device main body is straight and what is called a neck-bent-type device in which a reading head portion of the body is bent.

However, a problem remains that although it is desired to enable manipulations irrespective of whether a device is oriented in any direction when a barcode reader is used, at present there exists no portable terminal that satisfies this desire.

SUMMARY OF THE INVENTION

The present disclosure has been made in view of the above circumstances, and an object of this disclosure is therefore to provide a portable terminal that can be manipulated irrespective of whether the portable terminal is oriented vertically or horizontally.

According to the disclosure, whether the main body is used being oriented vertically or horizontally, a user can grip the main body of the portable terminal stably because the heavy battery pack housing region is always located at a low position in the main body. Furthermore, whether the main body is used being oriented vertically or horizontally, since the camera is always located at a high position in the back surface of the main body, an event that the camera is obstructed by a hand of the user can be avoided. Still further, since a region where to dispose the barcode reader module can always be secured at a high position in the back surface of the main body, the user can use the barcode reader module conveniently.

BRIEF DESCRIPTION OF THE DRAWINGS

FIGS. 3A to 3C show regions of the portable terminal according to the embodiment.

FIGS. 8A and 8B show a first example strap.

FIGS. 9A and 9B show a second example strap.

DETAILED DESCRIPTION OF THE EXEMPLARY EMBODIMENTS

A portable terminal according to a specific embodiment of the present disclosure will be hereinafter described in detail with reference to the drawings when necessary. However, unnecessarily detailed descriptions will be avoided. For example, a detailed description of a well-known item or a redundant description of substantially the same constituent element as an already described one may be made. This is to prevent the following description from becoming unnecessarily redundant and facilitate understanding of those skilled in the art. The accompanying drawings and the following description are provided to allow those skilled in the art to understand the disclosure thoroughly and are not intended to restrict the subject matter disclosed in the claims.

The embodiment that is suitable for practice of the disclosure will be hereinafter described in detail with reference to the drawings.

Figure 1:
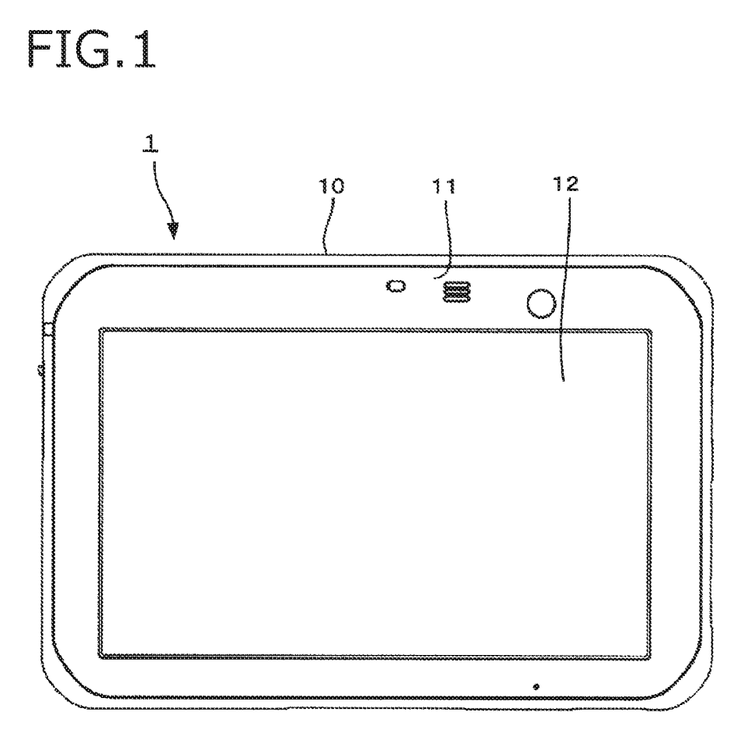
FIG. 1 is a front view of a portable terminal according to an embodiment of the present disclosure.
Figure 2:
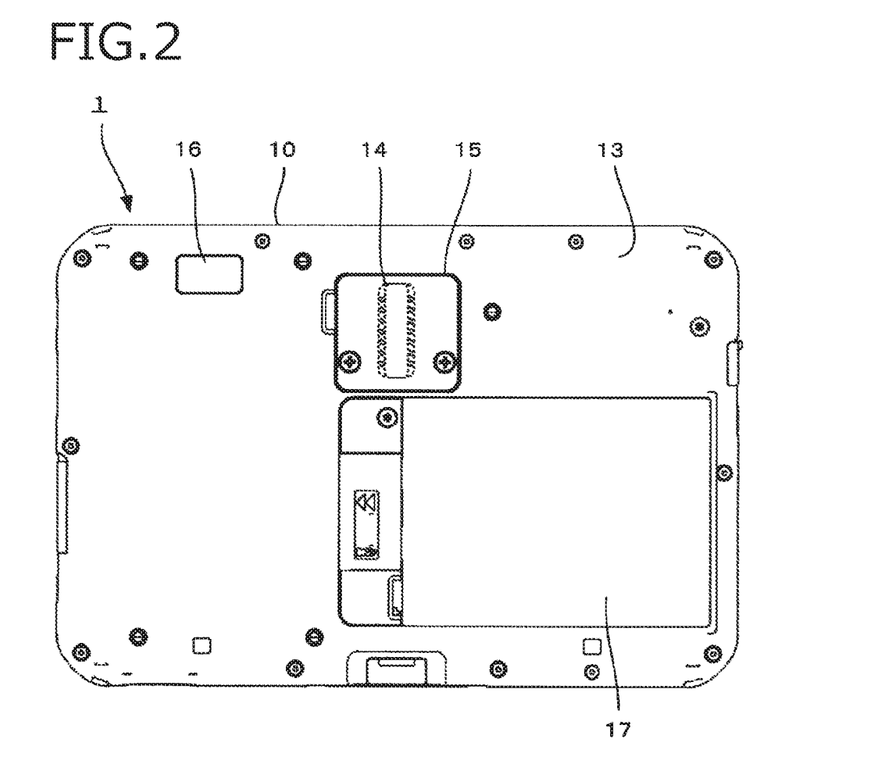
FIG. 2 is a rear view of the portable terminal shown in FIG. 1.

FIGS. 1 and 2 are a front view and a rear view, respectively, of a portable terminal 1 according to the embodiment of the disclosure.

The portable terminal 1 is a smartphone or an electronic device such as a tablet terminal, a digital camera, a portable personal computer, or a radio device, for uses including personal and business uses. A typical example of the portable terminal 1 is a tablet portable terminal that is shock-resistant, vibration-resistant, splash-proof, dust-proof, and of like features, is to be used in business sites of a construction, public safety, transportation, or like company, and is heavier than common portable terminals.

The portable terminal 1 has a main body 10 which is mainly made of a resin or a metal and rectangular in a plan view, a display 12 such as a liquid crystal panel or an organic EL panel which is provided in a front surface 11 of the main body 10, and a back surface 13 opposite to the front surface 11. The back surface 13 has a terminal 14, a terminal cover 15 which covers the terminal 14, a camera 16, and a battery pack housing region 17.

The display 12 is equipped with a touch panel that is approximately rectangular in a plan view. The display 12 has a UI (user interface) type display function capable of displaying icons, images, information/data, etc. and receiving manipulations. The terminal 14 enables electric connection to a barcode reader module 20 (described later). The camera 16 enables shooting in a state that the back surface 13 is directed to a target. The battery pack housing region 17 is a region for housing a battery pack.

Regions of the main body 10 will be described with reference to FIGS. 3A to 3C.

The main body 10 is divided into regions S1-S9 (nine divisional matrix regions) in a plan view by imaginary lines L (indicated by broken lines in FIGS. 3A-3C) that divide each of two orthogonal sides 10a and 10b of the main body 10 into three equal parts. The term "top side" is defined as one of the two sides 10a and 10b that is located at the top. In the embodiment, the top side and the lateral side are defined as the longer side 10a and the shorter side 10b, respectively. (Alternatively, the top side and the lateral side may be defined as the shorter side 10b and the longer side 10a, respectively. That is, the main body 10 may be divided into nine divisional matrix regions S1-S9 with the shorter side 10b as the top side.)

Figure 3A:
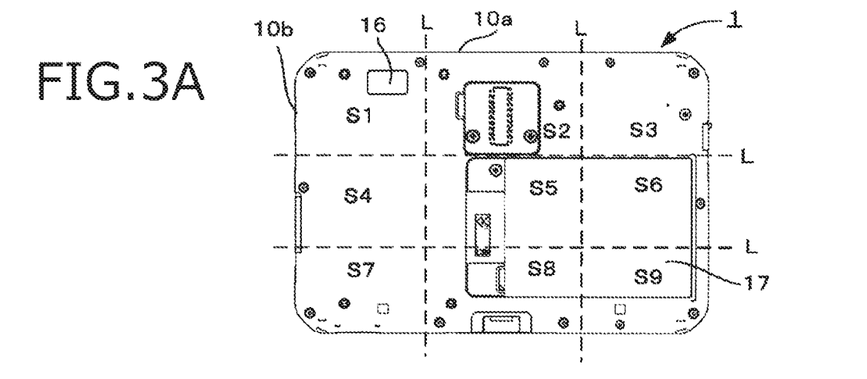
FIG. 3A shows first to ninth regions.
Figure 3B:
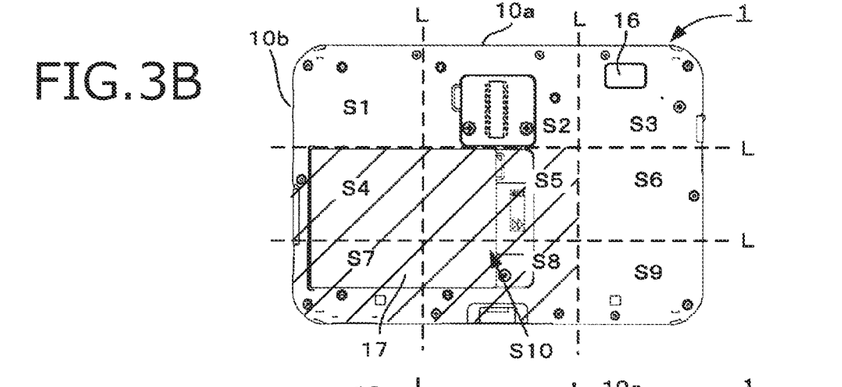
FIG. 3B shows a first combined region.
Figure 3C:
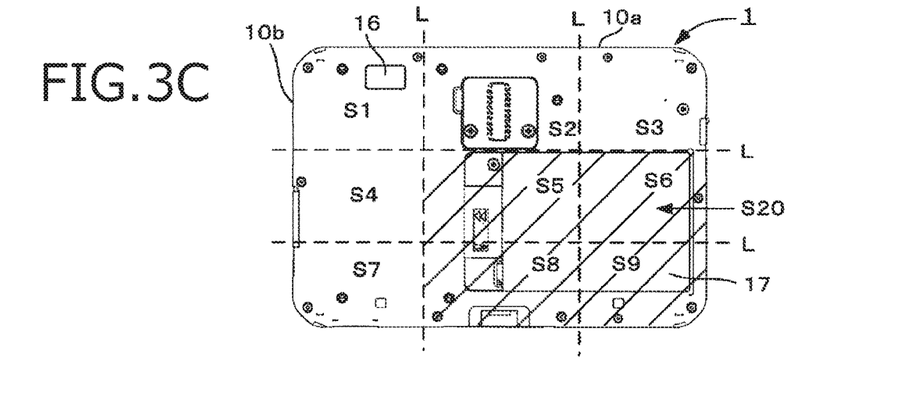
FIG. 3C shows a second combined region.

As shown in FIG. 3A, a first region S1, a second region S2, and a third region S3 are defined as the three regions that include the top side 10a and are arranged in this order from the left. A fourth region S4, a fifth region S5, and a sixth region S6 are defined as the three regions that are located under the first region S1, the second region S2, and the third region S3, respectively, and are arranged in this order from the left. A seventh region S7, an eighth region S8, and a ninth region S9 are defined as the three regions that are located under the fourth region S4, the fifth region S5, and the sixth region S6, respectively, and are arranged in this order from the left.

A first combined region S10 (hatched in FIG. 3B) is defined as a combined region of the fourth region S4, the fifth region S5, the seventh region S7, and the eighth region S8. A second combined region S20 (hatched in FIG. 3C) is defined as a combined region of the fifth region S5, the sixth region S6, the eighth region S8, and the ninth region S9.

Although in the embodiment the battery pack housing region 17 is provided in the second combined region S20 and the camera 16 is provided in the first region S1 (see FIG. 3C), this arrangement can be changed. For example, as shown in FIG. 3B, where the battery pack housing region 17 is located in the first combined region S10, the camera 16 may be provided in the third region S3. These arrangements can prevent an event that the camera 16 is obstructed by a hand of the user irrespective of whether the main body 10 is oriented vertically or horizontally.

Figure 4:
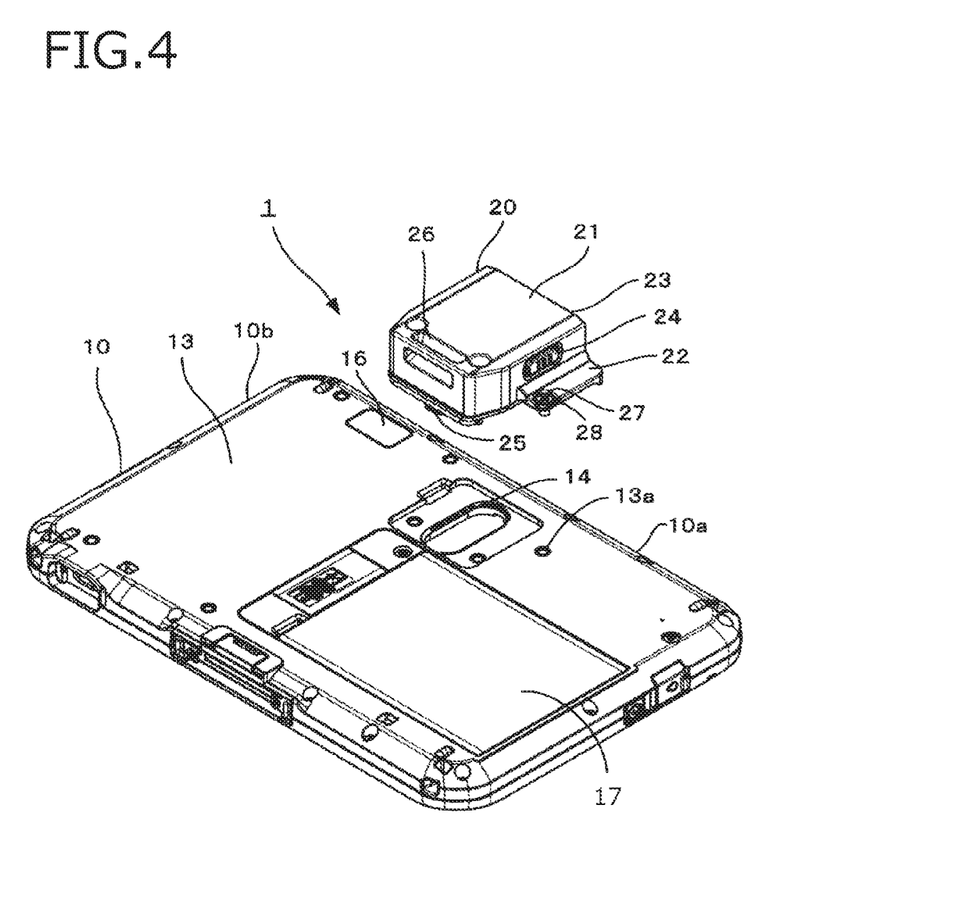
FIG. 4 is an exploded perspective view including a first embodiment bar code reader module employed in the disclosure.
Figure 5:
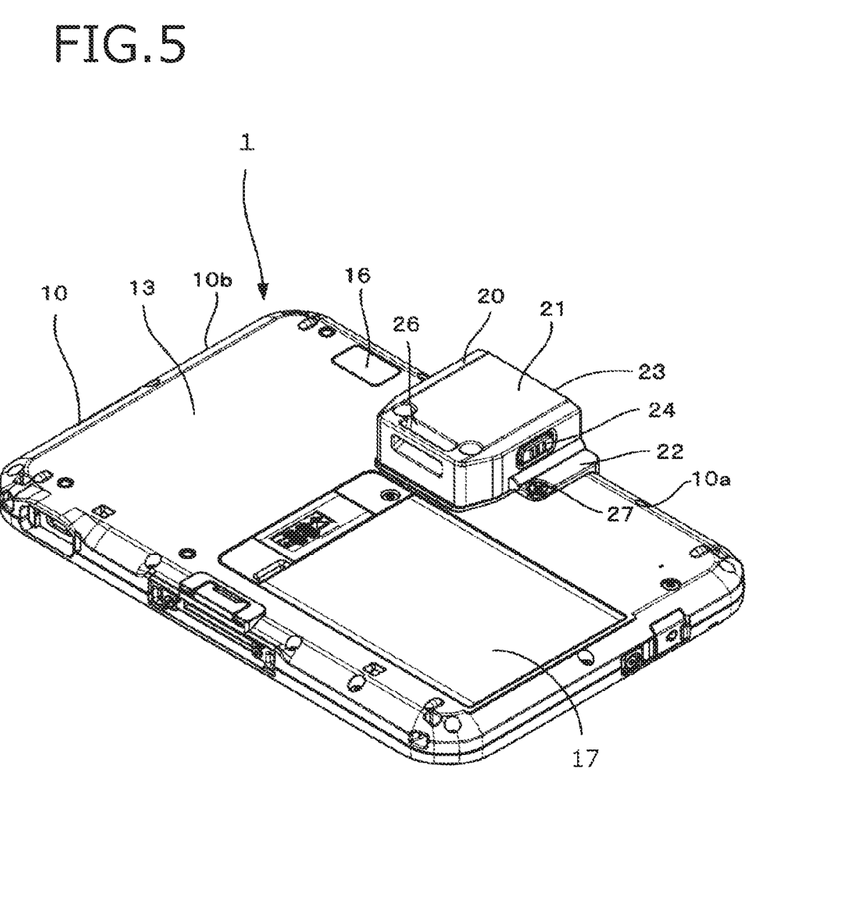
FIG. 5 is a perspective view showing a state that the bar code reader module shown in FIG. 4 is attached to a main body of the portable terminal according to the embodiment.

FIG. 4 is an exploded perspective view including a first embodiment bar code reader module 20. FIG. 5 is a perspective view, as viewed from the back side, showing a state that the bar code reader module 20 shown in FIG. 4 is attached to the main body 10. The first embodiment bar code reader module 20 will be described below with reference to FIGS. 4 and 5.

The first embodiment bar code reader module 20 is disposed in the second region and assumes a rectangular shape in a plan view. The bar code reader module 20 is equipped with a main body 21 and an attachment portion 22 which projects sideways from the main body 21. The main body 21 is equipped with a reader camera 23 for reading a barcode, a switch 24 for manipulation for reading by the reader camera 23, a module-side terminal 25 for electric connection to the terminal 14, and a support portion 26 for supporting one end portion of a strap 30 (described later). The attachment portion 22 is formed with an insertion hole 28 into which a screw 27 is to be inserted. Although the switch 24 is provided on one side surface of the main body 21, two switches may be provided on two respective side surfaces of the main body 21.

The barcode reader module 20 is attached to the main body 10 according to the following procedure. First, the terminal cover 15 is removed from the back surface 13 by disengaging the screws that have fixed the terminal cover 15 to the main body 10 and the module-side terminal 25 of the bar code reader module 20 is electrically connected to the terminal 14. Then the barcode reader module 20 is fixed to the back surface 13 by inserting the screw 27 into the insertion hole 28 of the attachment portion 22 and engaging the screw 27 with a screw hole 13a of the main body 10.

Figure 6:
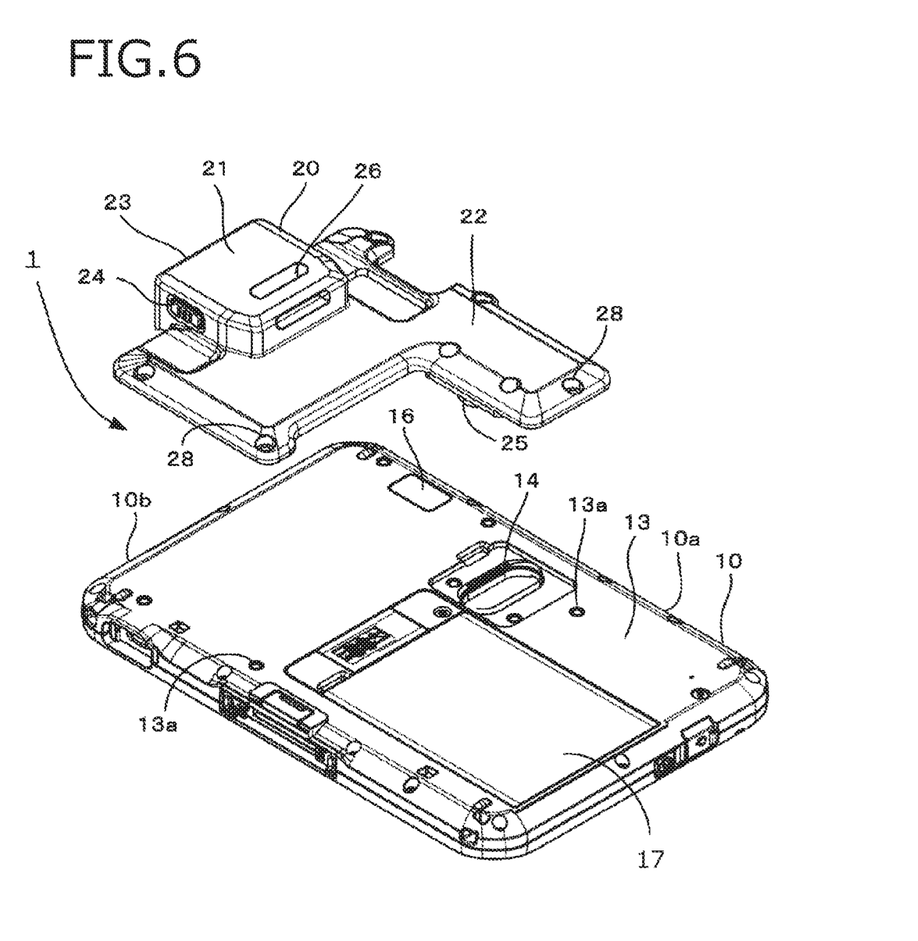
FIG. 6 is an exploded perspective view of a second embodiment bar code reader module employed in the disclosure.
Figure 7:
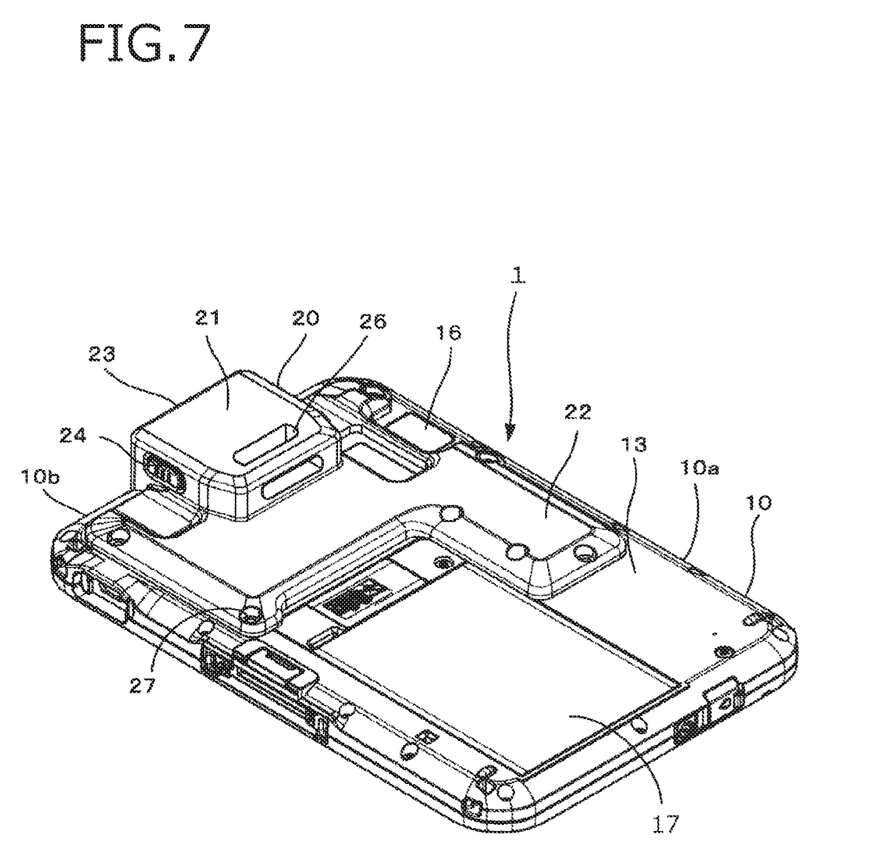
FIG. 7 is a perspective view showing a state that the bar code reader module shown in FIG. 6 is attached to the main body of the portable terminal according to the embodiment.

FIG. 6 is an exploded perspective view including a second embodiment bar code reader module 20. FIG. 7 is a perspective view, as viewed from the back side, showing a state that the bar code reader module 20 shown in FIG. 6 is attached to the main body 10. The second embodiment bar code reader module 20 will be described below with reference to FIGS. 6 and 7.

The second embodiment bar code reader module 20 is L-shaped in a plan view because the attachment portion 22 extends sideways long from the main body 21. The module terminal 25 is provided in the attachment portion 22. Whereas in the first embodiment the reader camera 23 is directed to the outside of the top side 10a because the portable terminal 1 is to be used being oriented horizontally, in the second embodiment the reader camera 23 is directed to the outside of the lateral side 10a because the portable terminal 1 is to be used being oriented vertically. The main body 21 of the bar code reader module 20 is disposed in the fourth region S4.

Like the first embodiment the reader camera 23, the second embodiment bar code reader module 20 can be attached to the back surface 13 by removing the terminal cover 15 and then fixing the attachment portion 22 to the back surface 13.

Whether the main body 10 is used being oriented vertically or horizontally, the user can grip the main body 10 of the portable terminal 1 stably because the heavy battery pack housing region 17 is always located at a low position in the main body 10. Furthermore, whether the main body 10 is used being oriented vertically or horizontally, since the camera 16 is always located at a high position in the back surface 13 of the main body 10, an event that the camera 16 is obstructed by a hand of the user can be avoided. Still further, since a region where to dispose the barcode reader module 20 can always be secured at a high position in the back surface 13 of the main body 10, the user can use the barcode reader module 20 conveniently.

Figure 8A:
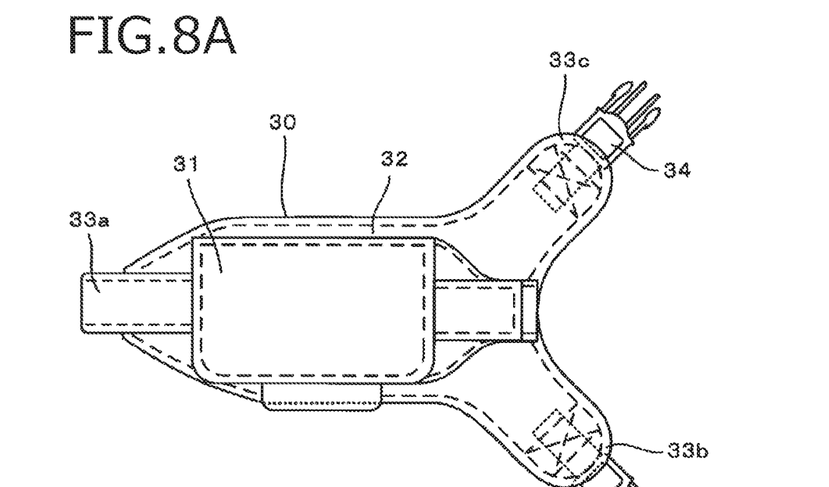
FIG. 8A is a front view of the first example strap and FIG. 8B is a conceptual diagram showing a state that the first example strap is attached to the portable terminal according to the embodiment.
Figure 8B:
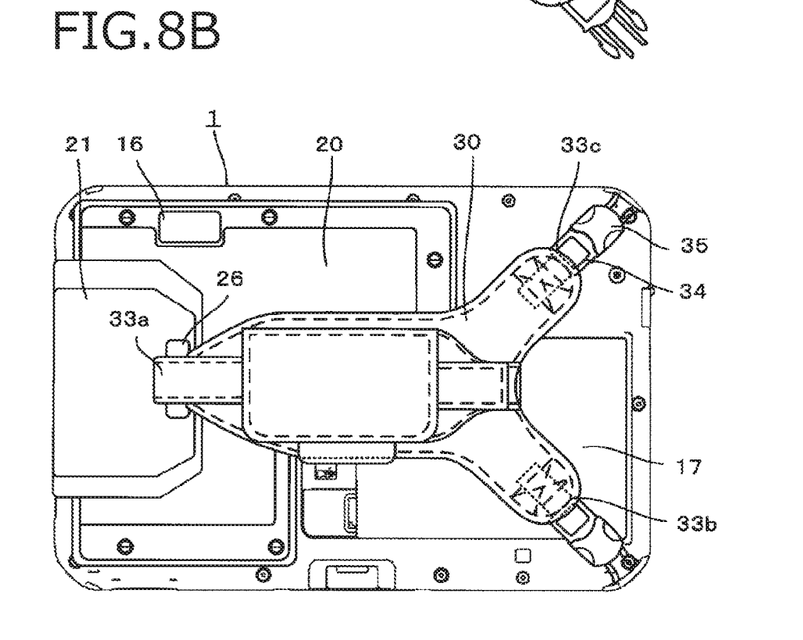
Figure 9A:
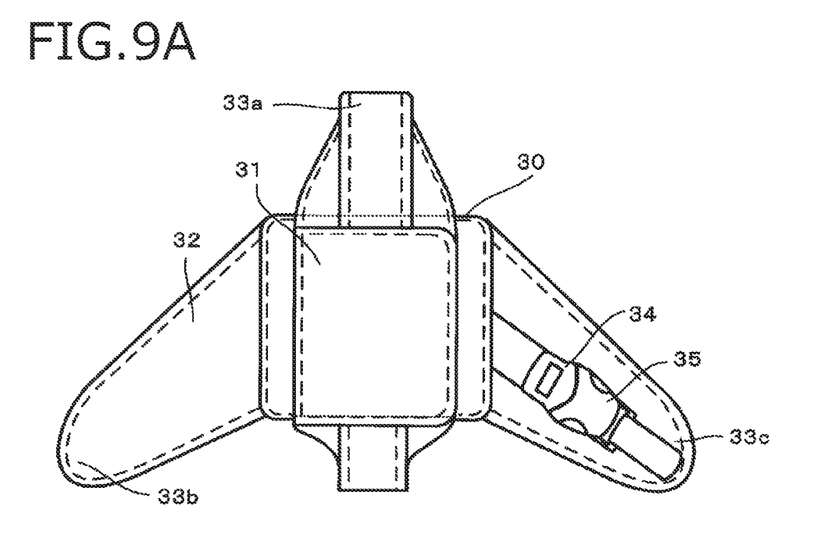
FIG. 9A is a front view of the second example strap and FIG. 9B is a conceptual diagram showing a state that the second example strap is attached to the portable terminal according to the embodiment.
Figure 9B:
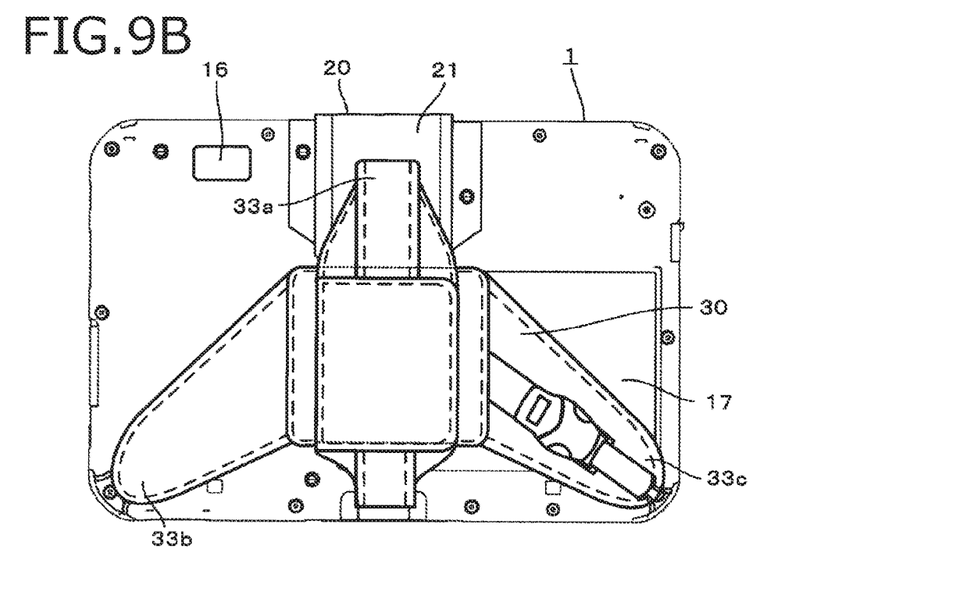

FIGS. 8A and 8B show a first example strap 30 to be attached to the main body 10 of the portable terminal 1 according to the embodiment; FIG. 8A is a front view of the first example strap 30 and FIG. 8B is a conceptual diagram showing a state that the first example strap 30 is attached to the main body 10. FIGS. 9A and 9B show a second example strap 30 to be attached to the main body 10 of the portable terminal 1 according to the embodiment; FIG. 9A is a front view of the second example strap 30 and FIG. 9B is a conceptual diagram showing a state that the second example strap 30 is attached to the main body 10. The two kinds of straps 30 will be described below with reference to FIGS. 8A and 8B and FIGS. 9A and 9B.

Each of the two kinds of straps 30 for gripping which are made of leather or cloth, are belt-shaped, and are deformable can be attached to the back surface 13 of the main body 10.

Each kind of straps 30 is equipped with a first member 31 and a second member 32 which is disposed over and connected to the first member 31. A space into which a finger(s) can be inserted to grip the strap 30 is formed between the first member 31 and the second member 32.

Each kind of straps 30 has three end portions 33 so as to be attached to the back surface 13 of the main body 10 at three positions. A first end portion 33a is attached to the main body 21 of the bar code reader module 20, and a second end portion 33b and a third end portion 33c are attached to respective corners of the main body 10 of the portable terminal 1.

In the first example strap 30, the second end portion 33b and the third end portion 33c are attached to the ninth region S9 and the third region S3 of the main body 10, respectively. In the second example strap 30, the second end portion 33b and the third end portion 33c are attached to the seventh region S7 and the ninth region S9 of the main body 10, respectively.

Examples of various attachment structures will be described below with reference to FIGS. 8 and 9. The first end portion 33a is attached to the support portion 26 of the main body 21 of the bar code reader module 20 by a metal fitting, a thin cord, or the like.

In the first example strap 30, each of the second end portion 33b and the third end portion 33c is provided with an engagement piece 34 and is attached to the main body 10 by engaging the engagement piece 34 with a lock portion 35 which is attached to the corner of the main body 10 by a known thin cord or the like.

In the second example strap 30, the second end portion 33b is attached to the main body 10 by hooking, on a metal fitting or the like, a thin cord that is provided on the back side of the second end portion 33b. The third end portion 33c is attached to the main body 10 by engaging an engagement piece 34 provided on the third end portion 33c with a lock portion 35 which is attached to the corner of the main body 10.

There are no limitations on the structures for attaching the end portions 33 to the main bodies 10 and 21.

As described above, the first example strap 3 is attached to the portable terminal 1 with the second embodiment barcode reader module 20 and the second example strap 3 is attached to the portable terminal 1 with the first embodiment barcode reader module 20. Although the example straps 30 that are Y-shaped in a plan view have been described above, I-shaped or X-shaped straps may also be employed. In the case of an I-shaped strap, one end portion 33 is attached to the eighth region S8.

There are no particular limitations on the plan-view shape of the strap 30. The second member 32 may be attached to the first member 31 rotatably.

Covering the back surface 13 of the main body 10 over a wide area, each of the example straps 30 can protect the main body 10 and is suitable for heavy portable terminals 1 for, for example, business use. When either of the example straps 30 is used, the bar code reader module 20 can be used stably and the camera 16 that is disposed in the first region S1 or the third region S3 is not obstructed.

Although the portable terminal according to the embodiment of the disclosure has been described above with reference to the drawings, it goes without saying that the disclosure is not limited to the embodiment. It is apparent that those skilled in the art would conceive various changes, modifications, replacements, additions, deletions, or equivalents within the confines of the claims And such changes etc. should naturally be construed as being included in the technical scope of the disclosure.

The portable terminal according to the disclosure is useful when applied to fields in which it is equipped with a barcode reader module capable of being used irrespective of whether it is oriented vertically or horizontally.

What is claimed is:

1. A portable terminal comprising:
   a main body that has a first surface provided with a display and a second surface opposite to the first surface, and has a rectangular shape in a plan view;
   a first camera configured to shoot a target in a state that the second surface is directed to the target, wherein:
   the main body is divided into nine divisional matrix regions by drawing imaginary lines that divide each of two sides being orthogonal to each other among four sides of the second surface into three equal parts;
   a top side is defined as one of the two sides that is located at the top of the main body, and a first region, a second region, and a third region of the main body are defined as three regions including the top side arranged in this order from the left of the main body;
   a fourth region, a fifth region, and a sixth region of the main body are defined as three regions that are located under the first region, the second region, and the third region, respectively, and arranged in this order from the left;
   a seventh region, an eighth region, and a ninth region of the main body are defined as three regions that are located under the fourth region, the fifth region, and the sixth region, respectively, and are arranged in this order from the left;
   a first combined region is defined as a region in which the fourth region, the fifth region, the seventh region, and the eighth region are combined;
   a second combined region is defined as a region in which the fifth region, the sixth region, the eighth region, and the ninth region are combined;
   a battery pack housing region configured to house a battery pack is provided in the first combined region or the second combined region;
   the first camera is provided in the third region in a case where the battery pack housing region is located in the first combined region, and the first camera is provided in the first region in a case where the battery pack housing region is located in the second combined region;
   the second surface is attachable to a barcode reader module;
   the barcode reader module has a second camera for reading a barcode; and
   when the barcode reader module is attached to the second surface, the second camera reads the barcode in a state that the second surface is directed to the barcode and the second camera is located in the second region of the second surface.

2. The portable terminal according to claim 1, wherein:
   the barcode reader module has a support portion to which one end portion of a strap is attached; and
   when the barcode reader module is attached to the second surface, the second camera and the support portion are located in the second region of the second surface.

3. The portable terminal according to claim 2, wherein:
the support portion of the barcode reader module is a strap hole and the one end portion of the strap is bounded to the strap hole.

4. The portable terminal according to claim 2, wherein:
the one end portion of the strap is attached to the support portion of the barcode reader module and other end portion of the strap is attached to the main body so that the strap straddles over the battery pack housing region.

5. A portable terminal comprising:
a main body that has a first surface provided with a display and a second surface opposite to the first surface, and has a rectangular shape in a plan view;
a first camera configured to shoot a target in a state that the second surface is directed to the target, wherein:
the main body is divided into nine divisional matrix regions by drawing imaginary lines that divide each of two sides being orthogonal to each other among four sides of the second surface into three equal parts;
a top side is defined as one of the two sides that is located at the top of the main body, and a first region, a second region, and a third region of the main body are defined as three regions including the top side arranged in this order from the left of the main body;
a fourth region, a fifth region, and a sixth region of the main body are defined as three regions that are located under the first region, the second region, and the third region, respectively, and arranged in this order from the left;
a seventh region, an eighth region, and a ninth region of the main body are defined as three regions that are located under the fourth region, the fifth region, and the sixth region, respectively, and are arranged in this order from the left;
a first combined region is defined as a region in which the fourth region, the fifth region, the seventh region, and the eighth region are combined;
a second combined region is defined as a region in which the fifth region, the sixth region, the eighth region, and the ninth region are combined;
a battery pack housing region configured to house a battery pack is provided in the first combined region or the second combined region;
the first camera is provided in the third region in a case where the battery pack housing region is located in the first combined region, and the first camera is provided in the first region in a case where the battery pack housing region is located in the second combined region; and
an electric connection terminal configured to conduct electric connection to an external module is provided in the second region of the second surface.

6. The portable terminal according to claim 5, wherein:
the external module has a support portion to which one end portion of a strap is attached; and
the one end portion of the strap is attached to the support portion of the external module which is attached to the electric connection terminal.

7. The portable terminal according to claim 6, wherein:
the support portion is a strap hole and the one end portion of the strap is bounded to the strap hole.

8. The portable terminal according to claim 6, wherein:
the one end portion of the strap is attached to the support portion of the external module and other end portion of the strap is attached to the main body so that the strap straddles over the battery pack housing region.

9. The portable terminal according to claim 5, wherein:
the external module has a second camera for reading a barcode; and
the second camera of the external module which is attached to the electric connection terminal reads the barcode in a state that the second surface is directed to the barcode.

10. The portable terminal according to claim 9, wherein:
the external module has a support portion to which one end portion of a strap is attached; and
the one end portion of the strap is attached to the support portion of the external module which is attached to the electric connection terminal.

11. The portable terminal according to claim 10, wherein:
the support portion is a strap hole and the one end portion of the strap is bounded to the strap hole.

12. The portable terminal according to claim 10, wherein:
the one end portion of the strap is attached to the support portion of the external module and other end portion of the strap is attached to the main body so that the strap straddles over the battery pack housing region.

* * * * *